(12) United States Patent
Bernhardt

(10) Patent No.: US 8,781,719 B1
(45) Date of Patent: Jul. 15, 2014

(54) HIGH-LOW AIRDROP WIND MANAGEMENT

(75) Inventor: Roger David Bernhardt, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 13/539,884

(22) Filed: Jul. 2, 2012

(51) Int. Cl.
*G06G 7/70* (2006.01)

(52) U.S. Cl.
USPC .................. 701/120; 701/408; 244/137.1

(58) Field of Classification Search
USPC ....... 244/137.1, 137.3, 152, 138 R, 142, 139; 701/102, 120, 3, 213; 340/961; 342/24, 342/36, 357.53
See application file for complete search history.

(56) References Cited

U.S. PATENT DOCUMENTS

| | | | | |
|---|---|---|---|---|
| 3,979,086 A * | 9/1976 | MacAdam | ................ | 244/3.19 |
| 5,878,819 A * | 3/1999 | Denoize et al. | ................ | 169/53 |
| 5,904,724 A * | 5/1999 | Margolin | ................ | 701/120 |
| 6,308,043 B1 * | 10/2001 | Solheim et al. | ................ | 455/63.1 |
| 6,343,244 B1 * | 1/2002 | Yoneda et al. | ................ | 701/3 |
| 6,549,162 B1 * | 4/2003 | Gage et al. | ................ | 342/353 |
| 6,758,442 B2 * | 7/2004 | Bailey | ................ | 244/142 |
| 7,082,296 B2 * | 7/2006 | Zavidniak | ................ | 455/410 |
| 7,284,727 B2 * | 10/2007 | Nolan | ................ | 244/136 |
| 7,337,042 B2 * | 2/2008 | Marian | ................ | 700/284 |
| 7,844,517 B2 * | 11/2010 | Willen et al. | ................ | 705/35 |
| 8,271,179 B2 * | 9/2012 | Parras | ................ | 701/102 |
| 2003/0197095 A1 * | 10/2003 | Preston | ................ | 244/152 |
| 2004/0215394 A1 * | 10/2004 | Carpenter et al. | ................ | 702/3 |
| 2005/0143904 A1 * | 6/2005 | Haas | ................ | 701/120 |
| 2006/0054744 A1 * | 3/2006 | Haas | ................ | 244/137.1 |
| 2006/0255916 A1 * | 11/2006 | Cox | ................ | 340/10.1 |
| 2008/0078881 A1 * | 4/2008 | Parras | ................ | 244/137.1 |
| 2008/0169975 A1 * | 7/2008 | Yee | ................ | 342/26 R |
| 2009/0026319 A1 * | 1/2009 | Strong | ................ | 244/152 |
| 2012/0191332 A1 * | 7/2012 | Sawhill et al. | ................ | 701/120 |
| 2012/0191333 A1 * | 7/2012 | Sawhill et al. | ................ | 701/122 |
| 2012/0228432 A1 * | 9/2012 | Fox, Jr. | ................ | 244/137.3 |
| 2013/0009013 A1 * | 1/2013 | Bourakov et al. | ................ | 244/186 |
| 2013/0048787 A1 * | 2/2013 | Riley et al. | ................ | 244/137.1 |
| 2013/0162974 A1 * | 6/2013 | Dakin et al. | ................ | 356/28 |
| 2013/0231803 A1 * | 9/2013 | Barraci et al. | ................ | 701/3 |
| 2013/0259304 A1 * | 10/2013 | Aller | ................ | 382/103 |

* cited by examiner

*Primary Examiner* — Christopher P Ellis
*Assistant Examiner* — Medhat Badawi
(74) *Attorney, Agent, or Firm* — Yee & Associates, P.C.

(57) ABSTRACT

A method and apparatus for managing an airdrop system. Wind around an aircraft is measured to form first wind information. Wind around a target location is measured to form second wind information. A four-dimensional wind profile for use in deploying the airdrop system from the aircraft is generated using the first wind information and the second wind information.

20 Claims, 7 Drawing Sheets

HIGH-LOW AIRDROP WIND MANAGEMENT

BACKGROUND INFORMATION

1. Field

The present disclosure relates generally to airdrops and, in particular, to controlling airdrops using wind information. Still more particularly, the present disclosure relates to a method and apparatus for generating predictive wind information for managing airdrops.

2. Background

Airdrops are typically used to deliver cargo to various locations in which other types of cargo delivery systems may not be able to access. For example, airdrops may be used to resupply troops, provide humanitarian aid, deliver equipment, deliver vehicles, and for other suitable purposes.

An airdrop involves delivering cargo through an airdrop system. The airdrop system may include, for example, one or more parachutes attached to a payload. The payload is the cargo to be delivered. An airdrop system also may include a controller that controls the opening of parachutes as well as other components. All airdrop systems are susceptible to errors due to the winds present in the air at the time the airdrop systems make their descent, unless the winds are well-known and stable.

Airdrops may be, for example, high airdrops and low airdrops. A high airdrop is considered to be one made at an altitude in which the region of air that is free from significant ground turbulence effects on a small scale. A low airdrop is one made at an altitude where the dominant influence on the wind is the ground terrain effects. These regions are typically well below the level of mountaintops as air flows in large valleys are generally mostly influenced by the larger scale wind flows.

When performing airdrops at a low enough altitude, other components configured to change the direction at which the airdrop system travels may be cost prohibitive, unnecessary, and impractical. These lower altitudes, such as about 100 feet to about 2,000 feet above ground level, also may involve wind errors due to required rapid deceleration and undesired risks due to gunfire, terrain, and other risks from an altitude.

In other instances, the airdrop may be performed from higher altitudes such as about 5,000 feet above ground level and higher. With these higher altitudes, the accuracy at which cargo may be delivered to a target location may decrease. For example, the wind may affect where the airdrop system lands as the distance to the ground increases.

With these higher altitudes, an airdrop system may include other components such as a computer, a global positioning and inertial navigation system, navigation control software, and other components that may be configured to control the descent of the airdrop system. These components may change the configuration of the parachute to change the path of the airdrop system as it descends toward the target location. The global positioning and inertial navigation system may provide information to calculate the location, direction of travel, and speed of the airdrop system over time. The navigation control software may be used to control the triggers and actuators to direct the airdrop system toward the target location using the information from the global positioning and inertial navigation system. However, wind is still a factor in the final approach for these airdrop systems and impacts the final accuracy beyond desired levels given the cost of the airdrop systems.

Although more sophisticated airdrop systems may provide greater safety, reasonable accuracy in reaching a target location, and have a capability to change the path of the airdrop system as it descends, all airdrop systems are susceptible to errors due to the winds present in the air at the time they make their descent. Sophisticated systems bring with them components that add cost and weight beyond that which is desired.

Therefore, it would be desirable to have a method and apparatus that takes into account at least some of the issues discussed above, as well as possibly other issues.

SUMMARY

In one illustrative embodiment, a method for managing an airdrop system is provided. Wind around an aircraft is measured to form first wind information. Wind around a target location is measured to form second wind information. A four-dimensional wind profile for use in deploying the airdrop system from the aircraft is generated using the first wind information and the second wind information.

In another illustrative embodiment, a method for managing an airdrop system is provided. Wind information is identified. A four-dimensional wind profile is generated for use in deploying the airdrop system from an aircraft using the wind information and a number of wind models.

In still another illustrative embodiment, an apparatus comprises a wind profile generator. The wind profile generator is configured to receive first wind information from measurements of wind around an aircraft. The wind profile generator is further configured to receive second wind information from measurements of the wind around a target location. The wind profile generator is further configured to generate a four-dimensional wind profile for use in deploying an airdrop system from the aircraft using the first wind information and the second wind information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof will best be understood by reference to the following detailed description of an illustrative embodiment of the present disclosure when read in conjunction with the accompanying drawings, wherein:

DETAILED DESCRIPTION

Figure 1:
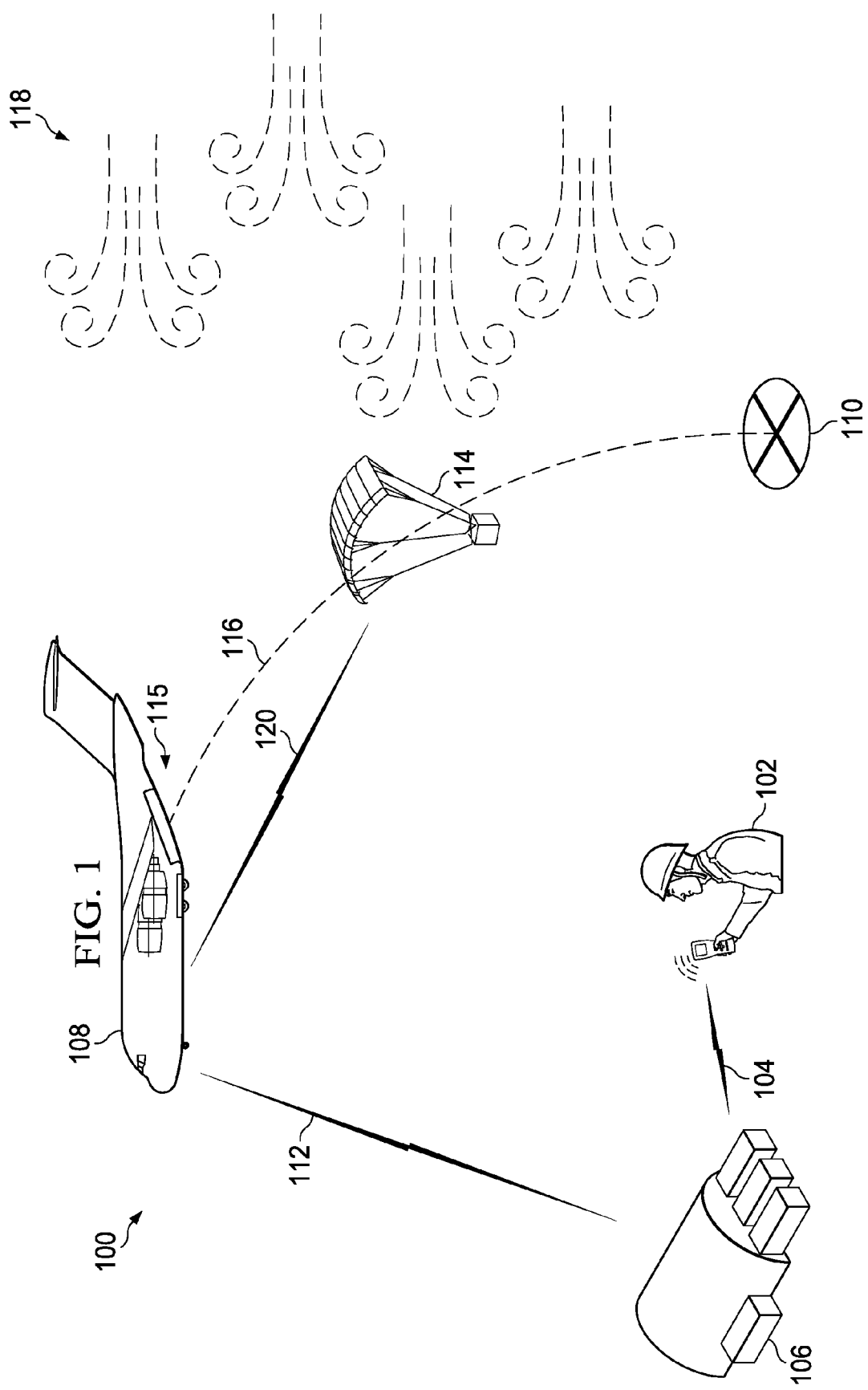
FIG. 1 is an illustration of an airdrop environment in accordance with an illustrative embodiment.

The illustrative embodiments recognize and take into account one or more different considerations. For example, the illustrative embodiments recognize and take into account that currently used airdrop systems do not take into account sufficient wind information to provide a desired level of accuracy for delivering cargo to a target location.

The illustrative embodiments recognize and take into account that currently used airdrop operations systems may only take into account limited wind information. This wind information may be identified by wind sensors dropped from an aircraft in multiple flyovers by the aircraft over a desired location. The illustrative embodiments also recognize and take into account that risk is present in multiple flyovers by the aircraft over the desired locations. For example, multiple flyovers by the aircraft may alert other parties to the fact that an aircraft is operating in the area. Further, multiple flyovers by the aircraft may alert other parties that the aircraft may be performing airdrop operations. The illustrative embodiments also recognize and take into account that currently used airdrop operations that provide limited wind information may be less accurate than desired.

The illustrative embodiments recognize and take into account, however, that the wind may vary at different locations and times along the path that the airdrop system travels to reach a target location. For example, the speed and the direction of the wind may change as the airdrop system descends to the target location.

The illustrative embodiments recognize and take into account that the speed and direction of the wind may change depending on the natural and man-made features along the path of the airdrop system. For example, rugged terrain may induce wind variability, other aircraft or objects in the path of the airdrop system may influence the speed and/or direction of the wind, or some other factor may influence the wind conditions at different locations and times along the path of the airdrop system.

The illustrative embodiments recognize and take into account that the wind may vary as altitudes vary. For example, winds at higher altitudes are at much higher speeds, while winds near the ground are more turbulent.

The illustrative embodiments recognize and take into account that a variety of unguided and guided airdrop systems of various configurations may use wind information to more accurately reach a target location. As a result, the illustrative embodiments recognize and take into account that an airdrop system may operate more accurately with more accurate wind information that provides a desired level of precision and predictive wind awareness.

With more accurate wind information, an unguided airdrop system may be released more precisely at the right place and time relative to winds and altitude. Additionally, with the use of guided airdrop systems, the path of the airdrop system may be controlled more accurately with wind information that predicts wind at different locations over time. This type of wind information may be four-dimensional wind profile data.

The illustrative embodiments recognize and take into account that the current deployment of wind sensors may not provide sufficiently precise wind information for unguided and guided airdrop systems. The wind information obtained by the deployment of these wind sensors may not be sufficiently precise because of the amount of separation in space and time between the wind sensors and the deployment location of the airdrop system. In other words, currently used wind sensors and the associated systems do not provide an accurate wind profile for the trajectory of the airdrop system along the desired path of the airdrop system to the target location. Additionally, the illustrative embodiments recognize and take into account that a guided airdrop system may not be able to change the path sufficiently to reach the target location as accurately as desired with the currently provided wind information from these wind sensors.

The illustrative embodiments recognize and take into account that it would be desirable to take into account both the wind in the environment around the aircraft from which the airdrop system is delivered and the wind at the target location at different points in time. The illustrative embodiments recognize and take into account that with this wind information, the wind throughout a volume through which the airdrop system may travel can be identified. In other words, wind conditions may reasonably be predicted at many locations and times along the path of the airdrop system if wind at the end points is characterized. In these illustrative examples, the end points may be the location of the aircraft and the target location.

For example, wind around an aircraft may be measured to form first wind information. Wind around the target location may be measured to form second wind information. From the first wind information and the second wind information, a four-dimensional wind profile can be generated for deploying an airdrop system from the aircraft and, when appropriate, updated for operating the airdrop system during descent of the airdrop system to a target location.

Further, the illustrative embodiments recognize and take into account that during the descent of an airdrop system, the wind may change from what is actually measured at a previous time. Thus, even if measurements of the wind were made all along the path for an airdrop system at one time, those winds may change when the airdrop system is actually deployed.

The illustrative embodiments also may update and predict winds that may be present for the different locations along the path of the airdrop system during the times at which the airdrop system is expected to reach those locations. These predictions may be included in the four-dimensional wind profiles that are used to deploy the airdrop system. The four-dimensional wind profiles also may be used to provide additional data if the airdrop system is a guided airdrop system. The updates may reflect changes in the predicted winds that are identified after the four-dimensional wind profiles are generated. As a result, the guided airdrop system may more accurately reach the target location.

With reference now to the figures, and in particular, with reference to FIG. 1, an illustration of an airdrop environment is depicted in accordance with an illustrative embodiment. In this illustrative example, airdrop environment 100 is an environment in which an illustrative embodiment may be implemented.

In this illustrative example, requester 102 is a human operator that sends a request using wireless communications link 104. This request may be made using any requesting system or technique currently known for requesting supplies in this illustrative example.

In response to receiving the request, ground station 106 dispatches or sends instructions to aircraft 108 to deliver supplies to requestor 102 at target location 110. These instructions are sent by ground station 106 to aircraft 108 over wireless communications link 112 in these illustrative examples.

Aircraft 108 travels near target location 110 and releases airdrop system 114 at deployment location 115. Airdrop system 114 travels along path 116 to target location 110 in this illustrative example. Target location 110 is an area that airdrop system 114 should land when reaching the ground.

As depicted, wind 118 may change at different altitudes along path 116 from aircraft 108 to target location 110 as airdrop system 114 travels along path 116 to target location 110. This change in wind 118 may be a change in speed, direction, or both speed and direction.

In these illustrative examples, information about wind 118 may be identified around aircraft 108. Further, information about wind 118 also may be identified around target location 110. The illustrative embodiments may also identify wind 118 in a volume encompassing path 116 and a volume encompassing possible changes to path 116. With this wind information, aircraft 108 may release airdrop system 114 at deployment location 115 to increase the ability of airdrop system 114 to travel along path 116 to more accurately reach target location 110.

In these illustrative examples, wind 118 is also predicted for locations along path 116 at the times at which airdrop system 114 is expected to reach those locations along path 116. As depicted, the sensing and prediction of wind 118 forms wind information that may be used to generate four-dimensional wind profiles for managing airdrop system 114.

A four-dimensional wind profile is information about wind 118 in four dimensions. The first three dimensions are coordinates that describe locations for wind 118, and the fourth dimension is time for wind 118. In particular, the time is one or more points in time during which airdrop system 114 may be released. The information about the wind 118 in these four-dimensions may be the speed and direction predicted for wind 118 for different locations and points in time.

In the illustrative examples, the management of airdrop system 114 may include, for example, where and when airdrop system 114 is released. Management of airdrop system 114 may also include controlling airdrop system 114 along path 116 if airdrop system 114 is a guided airdrop system able to manage changes in path 116.

In these illustrative examples, wireless communications link 120 also may be used to send four-dimensional wind profiles about wind 118, instructions, or both four-dimensional wind profiles and instructions from aircraft 108 to airdrop system 114 at different locations along path 116. In some illustrative examples, the four-dimensional wind profiles about wind 118 may be sent from ground station 106 to aircraft 108 over wireless communications link 112 and from aircraft 108 to airdrop system 114 over wireless communications link 120. The four-dimensional wind profiles about wind 118 may include predictions of wind 118 along or in a volume around path 116 for different periods of time.

These four-dimensional wind profiles may be used to adjust deployment location 115, path 116, or both deployment location 115 and path 116 for airdrop system 114 to more accurately reach target location 110 in these illustrative examples. The four-dimensional wind profiles may be sent prior to airdrop system 114 being released from aircraft 108, while airdrop system 114 travels along path 116, or both before airdrop system 114 is released and while airdrop system 114 travels along path 116.

Figure 2:
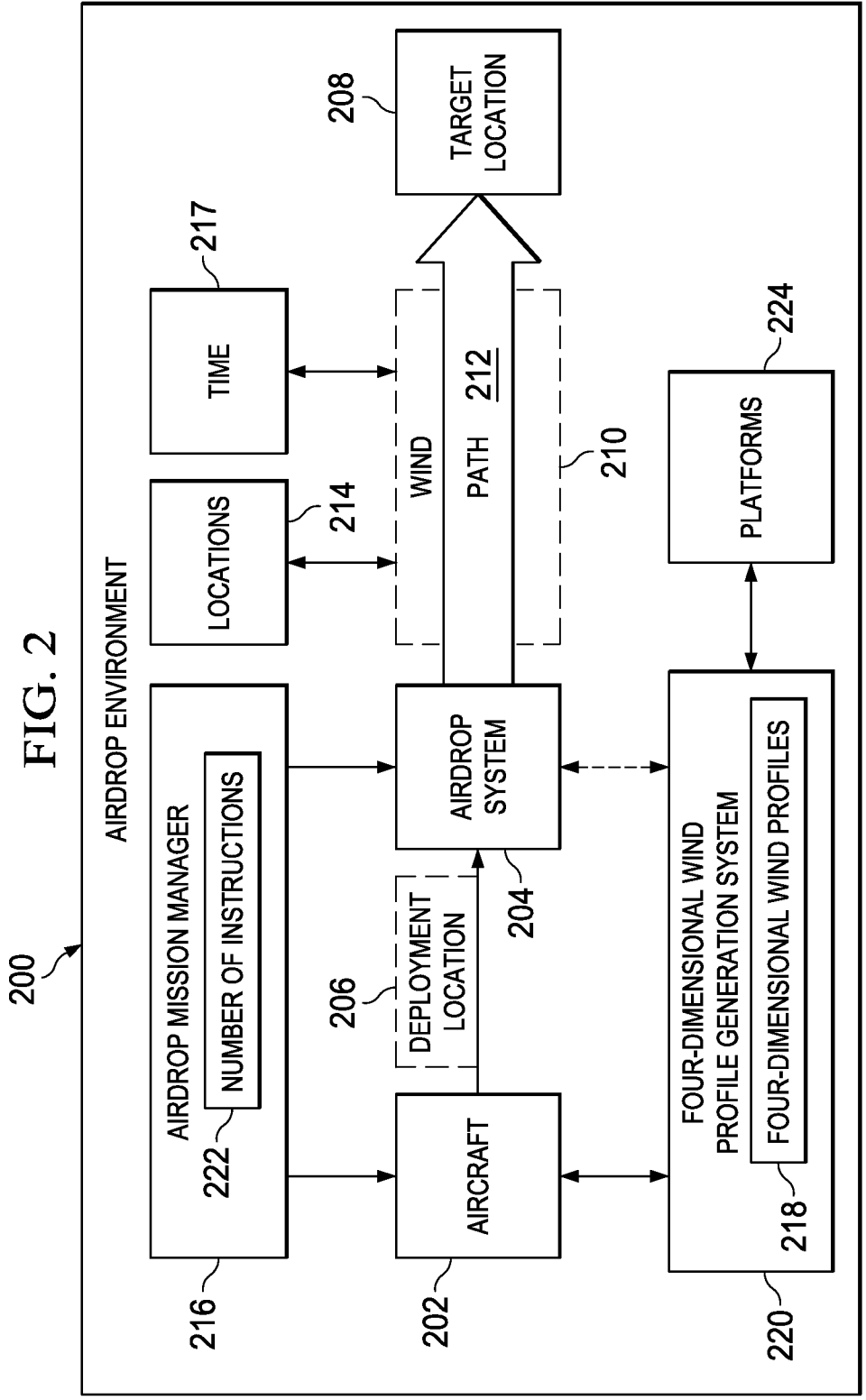
FIG. 2 is an illustration of a block diagram of an airdrop environment in accordance with an illustrative embodiment.

Turning now to FIG. 2, an illustration of a block diagram of an airdrop environment is depicted in accordance with an illustrative embodiment. Airdrop environment 100 in FIG. 1 is an example of one implementation for airdrop environment 200 shown in block form in this figure.

As depicted, airdrop environment 200 includes aircraft 202, airdrop system 204, airdrop mission manager 216, and four-dimensional wind profile generation system 220. Four-dimensional wind profile generation system 220 is included within airdrop environment 200 and operates to increase the accuracy at which airdrop system 204 reaches target location 208.

In airdrop environment 200, aircraft 202 may deploy airdrop system 204 from deployment location 206 in the air such that airdrop system 204 reaches target location 208 on the ground. In these illustrative examples, wind 210 may affect path 212 from deployment location 206 to target location 208. In other words, wind 210 may cause airdrop system 204 to land outside of target location 208.

Target location 208 is an area in which airdrop system 204 should land. This location may be, for example, without limitation, a point on an operationally practical and useful surface. For example, without limitation, target location 208 may be on a land-based structure, an aquatic-based structure, or some other suitable platform. Target location 208 also maybe an area of land, a side or base of a mountain, a beach, a lake, or some other geographic feature. Moreover, target location 208 may be a building, a landing zone on a man-made structure, a bridge, a dam, or some other man-made structure suitable for the landing of airdrop system 204. In some cases, target location 208 may not be on the ground. For example, target location 208 may be on the deck of a ship on the water. In this example, target location 208 may also move.

The size of target location 208 may vary depending on the particular implementation. For example, target location 208 may vary based on location features and terrain as well as operational considerations. As an example, target location 208 may vary based on operational considerations such as obstacles, threats, or hazards.

Further, target location 208 may vary while airdrop system 204 is traveling along path 212. For example, operational considerations may necessitate a change in target location 208 while airdrop system 204 is still in the air. When airdrop system 204 is a guided airdrop system, airdrop mission manager 216 may control path 212 of airdrop system 204 to target location 208. In this illustrative example, at least one of the deployment of airdrop system 204 from deployment location 206 and the control of path 212 of airdrop system 204 to target location 208 may be performed using number of instructions 222 generated by airdrop mission manager 216.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

For example, number of instructions 222 may specify deployment location 206. In another example, number of instructions 222 may be sent to airdrop system 204 to control path 212 of airdrop system 204 to reach target location 208 when airdrop system 204 is a guided airdrop system. When airdrop system 204 is an unguided airdrop system, number of instructions 222 may only specify deployment location 206.

Number of instructions 222 is generated using current measurements about wind 210, past measurements of wind 210, and other static information. However, number of instructions 222 generated by airdrop mission manager 216 may not be as accurate as desired without using four-dimensional wind profile generation system 220. In other words, currently used methods for generating number of instructions 222 are less accurate than when using a four-dimensional wind profile from four-dimensional wind profile generation system 220.

In these illustrative examples, wind 210 may vary over locations 214 along path 212 from deployment location 206 to target location 208. Locations 214 are three-dimensional locations in these illustrative examples. For example, locations 214 may be described using latitude, longitude, and altitude. In other words, wind 210 may vary along path 212 from deployment location 206 to target location 208. Additionally, wind 210 also may vary along path 212 over time 217. As a result, knowing information about wind 210 at the current point in time 217 may not be sufficiently accurate for deploying airdrop system 204 because the information about wind 210 may be different at a future point in time 217 when airdrop system 204 is deployed.

These illustrative examples include four-dimensional wind profile generation system 220 to generate four-dimensional wind profiles 218 for use in increasing the accuracy at which airdrop system 204 reaches target location 208. Four-dimensional wind profile generation system 220 is implemented using hardware and also may include software. In these illustrative examples, four-dimensional wind profile generation system 220 is configured to generate four-dimensional wind profiles 218.

One or more of four-dimensional wind profiles 218 may be used to deploy airdrop system 204 from aircraft 202 to reach target location 208 more accurately than currently possible. Four-dimensional wind profiles 218 include information predicted about wind 210 for locations 214 at different points in time 217. In other words, four-dimensional wind profiles 218 are sets of data used to manage deployment of airdrop system 204. In this manner, four-dimensional wind profiles 218 include wind information for a number of future points in time 217 at a number of locations 214.

In these illustrative examples, airdrop mission manager 216 may use one or more of four-dimensional wind profiles 218 to generate number of instructions 222 to manage the deployment of airdrop system 204. Number of instructions 222 may be used by at least one of aircraft 202 and airdrop system 204 to control path 212 of airdrop system 204 to target location 208.

Thus, with the availability of four-dimensional wind profiles 218, adjustments to at least one of deployment location 206, path 212, and other adjustments may be needed to take into account changes in wind 210 over time 217 at different locations 214. These adjustments may be performed to direct airdrop system 204 to target location 208 and may take into account wind 210 at future points in time 217 for locations 214. These future points in time 217 may be future points in time 217 during which airdrop system 204 is deployed from aircraft 202 and is travelling along path 212 to target location 208.

In these illustrative examples, four-dimensional wind profile generation system 220 may be located in one or more of platforms 224. In some illustrative examples, four-dimensional wind profile generation system 220 may be located in a single platform in platforms 224. In other illustrative examples, four-dimensional wind profile generation system 220 may be located in multiple platforms in platforms 224.

Further, when four-dimensional wind profile generation system 220 is located on more than one platform in platforms 224, four-dimensional wind profile generation system 220 may be considered to be distributed on these platforms. In these illustrative examples, the distribution of four-dimensional wind profile generation system 220 may cooperatively generate four-dimensional wind profiles 218. In other words, four-dimensional wind profiles 218 may be generated through distributed processing on different platforms in platforms 224. In other illustrative examples, each platform on which four-dimensional wind profile generation system 220 is located may independently generate four-dimensional wind profiles 218.

Platforms 224 may take various forms. For example, platforms 224 may be at least one of a mobile platform, a stationary platform, a land-based structure, an aquatic-based structure, an already deployed airdrop system, an aircraft, a surface ship, a tank, a personnel carrier, a train, a satellite, a submarine, and other suitable platforms. Thus, generating four-dimensional wind profiles 218 may be performed in a distributed manner.

Figure 3:
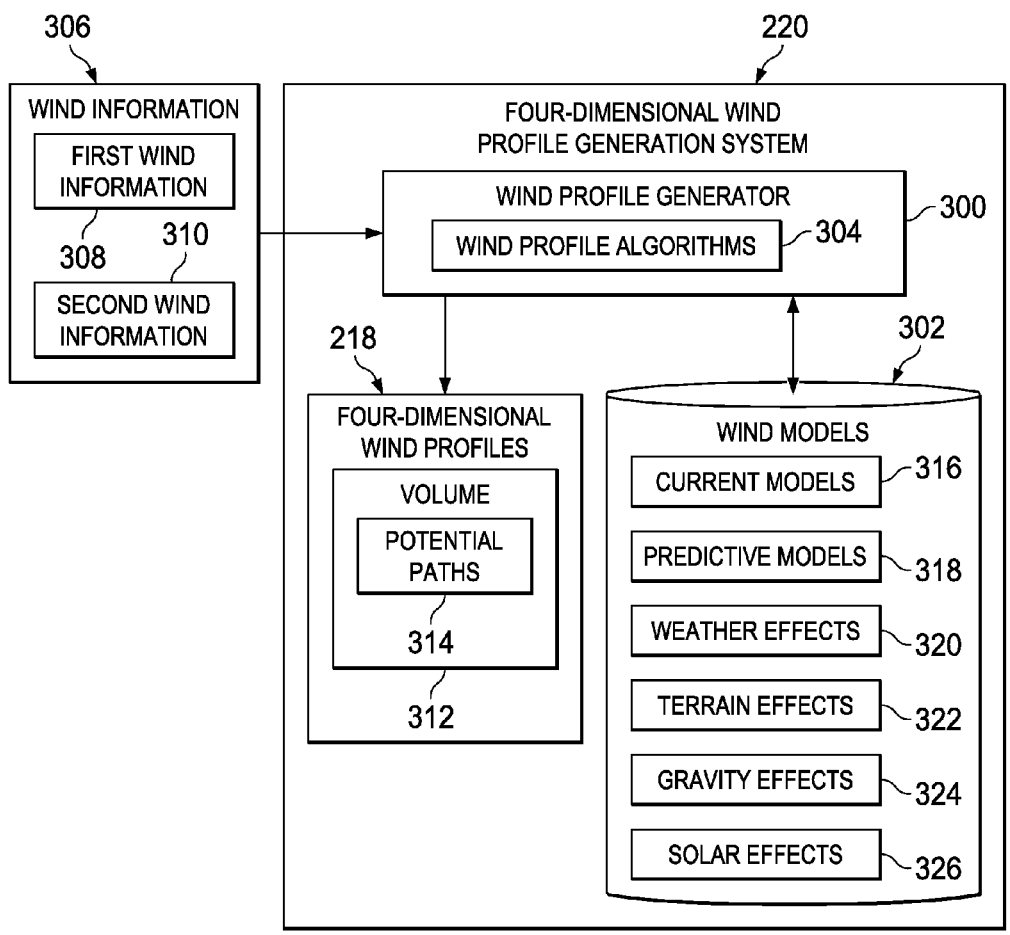
FIG. 3 is an illustration of a block diagram of a four-dimensional wind profile generation system in accordance with an illustrative embodiment.

Turning now to FIG. 3, an illustration of a block diagram of a four-dimensional wind profile generation system is depicted in accordance with an illustrative embodiment. In this depicted example, four-dimensional wind profile generation system 220 is implemented in a computer system. The computer system may include one or more computers. When more than one computer is present, those computers may be in communication with each other over a communications medium such as a network.

As depicted, examples of components that may be used to implement four-dimensional wind profile generation system 220 are shown. In this illustrative example, four-dimensional wind profile generation system 220 includes wind profile generator 300 and wind models 302.

Wind profile generator 300 may be implemented using hardware, software, or a combination of the two. In particular, wind profile generator 300 may include wind profile algorithms 304. When software is used, the operations performed by wind profile generator 300 may be implemented in program code configured to be run on a processor unit. When hardware is employed, the hardware may include circuits that operate to perform the operations in wind profile generator 300.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

Wind profile generator 300 generates four-dimensional wind profiles 218 using a number of wind models 302 and wind information 306. Wind information 306 may be received from a variety of different sources. For example, wind information 306 may be received using one or more sensor systems in locations selected from at least one of aircraft 202, airdrop system 204, target location 208, and platforms 224 in FIG. 2. Of course, wind information 306 may be received using sensor systems in other locations as well.

In these illustrative examples, wind information 306 is current or measured wind information rather than predicted wind information. Further, wind information 306 also may include weather reports in addition to information measured by sensor systems.

In these illustrative examples, wind information 306 may include information about wind 210 from two endpoints.

These two endpoints may be the location of aircraft 202 and target location 208 in FIG. 2. Of course, wind information 306 may include information about wind 210 from other locations other than these two endpoints.

As depicted in this illustrative example, wind 210 may be measured around aircraft 202 to form first wind information 308 in wind information 306. For example, first wind information 308 may be received from a sensor system associated with aircraft 202. Additionally, measurements of wind 210 also may be made around target location 208. These measurements may be made by a sensor system at or around target location 208. The measurements at or around target location 208 form second wind information 310 in wind information 306.

Wind information 306 may take various forms. For example, wind information 306 may include direction and speed of wind 210 at locations 214 in these illustrative examples.

As depicted, first wind information 308 and second wind information 310 received by wind profile generator 300 are used in generating four-dimensional wind profiles 218 using a number of wind models 302. Four-dimensional wind profiles 218 may include needed wind information to take into account time 217 when airdrop system 204 is predicted or scheduled to travel along path 212. For example, four-dimensional wind profiles 218 may include information about wind 210 at a future point in time 217 where airdrop system 204 may reach locations 214 along path 212 or along a number of potential paths 314 for airdrop system 204.

First wind information 308 and second wind information 310 may be used as input into a number of wind models 302 used by wind profile generator 300 to generate four-dimensional wind profiles 218. In particular, wind models 302 may be used to predict wind 210 at locations 214 between aircraft 202 and target location 208. This prediction may be made by wind profile generator 300 within volume 312 for different points in time 217 for one or more of locations 214.

In this illustrative example, volume 312 is a volume of airspace for which four-dimensional wind profiles 218 provide information about wind 210. Volume 312 may encompass potential paths 314 from aircraft 202 to target location 208. Potential paths 314 may be paths that airdrop system 204 may travel from aircraft 202 to target location 208. Potential paths 314 may be calculated to take into account operational considerations and/or other considerations within an airdrop environment.

In this illustrative example, wind models 302 may be used to predict information about wind 210 at different points in time 217 for different locations 214 for use in generating four-dimensional wind profiles 218. Wind models 302 may include current models 316, predictive models 318, or both current models 316 and predictive models 318. Current models 316 may provide current information about wind 210 for locations 214 between the locations for first wind information 308 and second wind information 310.

Predictive models 318 are models used to predict wind 210 for different points in time 217 for different locations 214. This information about wind 210 is used to generate four-dimensional wind profiles 218.

In these illustrative examples, first wind information 308, second wind information 310, or both first wind information 308 and second wind information 310 may be used as input into predictive models 318. The current wind information from current models 316 may be used as additional input into predictive models 318.

Wind models 302 take into account the effects of various sources when identifying current wind information for wind 210 and predicting future information about wind 210. These effects include, for example, without limitation, at least one of weather effects 320, terrain effects 322, gravity effects 324, solar effects 326, and other suitable types of effects that may be used to identify wind information 306. Wind models 302 may be used to identify current effects, predict future effects, or both identify current effects and predict future effects of various sources on wind 210.

Wind models 302 may be used to predict wind 210 along path 212 to target location 208 and at target location 208 to characterize wind variability and to validate four-dimensional wind profiles 218 where validation data exists. In these illustrative examples, the statistical variations of wind 210 near aircraft 202 and wind 210 near target location 208, as well as other wind variability statistics, can be used to characterize the predicted error in deploying airdrop system 204. This information about wind 210 may provide operational strategy and guide tactical preparations for receipt of airdrop system 204 at target location 208. In some illustrative examples, these wind variability statistics and other information may lead to termination of the airdrop due to strategic factors.

Weather effects 320 provide information about the effect of weather on wind 210. Weather effects 320 may be used to identify the effect of different types of weather conditions on wind 210. For example, without limitation, weather effects 320 may take into account regional forecasts, precipitation, cloud cover atmospheric disturbances from volcanic activities, and other types of weather conditions.

Terrain effects 322 on wind 210 may be identified around target location 208 using one or more of wind models 302. For example, if second wind information 310 is measured some distance from target location 208, terrain effects 322 of the terrain at or near target location 208 may be identified from wind models 302. As an example, speed and direction of wind 210 at target location 208 may be identified taking into account terrain effects 322.

In these illustrative examples, terrain effects 322 may take a number of different forms. Terrain effects 322 may be caused by natural structures and/or man-made structures in these illustrative examples. Natural structures may include different types of topography. For example, without limitation, natural structures may be mountains, rivers, canyons, or some other suitable types of natural structure. Man-made structures may be, for example, without limitation, buildings, urban canyons, bridges, dams, monuments, or some other suitable type of man-made structure.

Wind models 302 may identify terrain effects 322 on wind 210 taking into account natural structures and man-made structures to provide detailed information about wind 210 along path 212 through different types of terrain for four-dimensional wind profiles 218.

Wind models 302 also may take into account gravity effects 324 on wind 210. Solar effects 326 on wind 210 also may be taken into account by wind models 302. Solar effects 226 may include the effect of solar radiation variations by season, day, and time on wind 210.

In this manner, wind models 302 may take into account effects from many different sources. For example, topography and air density variations may have terrain effects 322 and weather effects 320 on wind 210 as cold dense air evolves and descends over rugged terrain, increasing wind 210 where little to no amount of wind 210 existed previously.

As another example, weather effects 320 and terrain effects 322 may be used with gravity effects 324 to identify the effects of gravity on wind 210 at various locations 214 and altitudes in locations 214. Terrain effects 322 may be used with gravity effects 324 to identify effects on wind 210 within volume 312 in these illustrative examples.

Thus, the different models in wind models 302 may be used individually or in conjunction with each other to identify needed wind information for four-dimensional wind profiles 218. Further, information generated from the different types of models in wind models 302 may be stored in four-dimensional wind profile generation system 220 for use in deployment of other airdrop systems.

For example, information generated for a particular location using terrain effects 322 may be stored in four-dimensional wind profile generation system 220 to enhance performance over time 217. In other words, wind profile generator 300 would not need to rely on wind models 302 to manage airdrop system 204 if sufficient information about target location 208 is already present. Thus, four-dimensional wind profile generation system 220 with wind models 302 provides more accurate information about wind 210 along path 212 and/or potential paths 314 for airdrop system 204.

The illustration of airdrop environment 200 in FIG. 2 and the different components in airdrop environment 200 in FIG. 2 and FIG. 3 are not meant to imply physical or architectural limitation the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, wind information 306 may include other wind information in addition to first wind information 308 and second wind information 310. The additional wind information may be identified from other locations in locations 214. These locations may be inside or outside of volume 312. For example, the additional wind information may be identified from measuring wind 210 at a number of other locations in addition to or around aircraft 202 and around target location 208.

This additional wind information may be identified using a sensor system associated with different platforms in platforms 224. For example, the additional wind information may be obtained from already deployed airdrop systems from platforms in platforms 224. This additional wind information may be used with first wind information 308, second wind information 310, both first wind information 308 and second wind information 310, or in place of first wind information 308 and/or second wind information 310, depending on the particular implementation.

In some illustrative examples, more than one aircraft may be present in airdrop environment 200 that is configured to airdrop multiple airdrop systems. In another illustrative example, four-dimensional wind profile generation system 220 may be in communication with airdrop system 204. For example, four-dimensional wind profile generation system 220 may update four-dimensional wind profiles 218 during movement of airdrop system 204 along path 212 after airdrop system 204 has been released from aircraft 202. The update of four-dimensional wind profiles 218 may be used by airdrop mission manager 216 to generate updates to number of instructions 222. In turn, number of instructions 222 with the updates generated by airdrop mission manager 216 may be sent to airdrop system 204 for use during descent of airdrop system 204. These updates may be used by the airdrop system to change path 212 in a manner that causes airdrop system 204 to land closer to target location 208.

In other illustrative examples, airdrop system 204 may use a four-dimensional wind profile in four-dimensional wind profiles 218 to control path 212 of airdrop system 204 to target location 208. For example, airdrop system 204 may generate number of instructions 222 using a four-dimensional wind profile in four-dimensional wind profiles 218.

Wind information 306 used to generate four-dimensional wind profiles 218 may be used for a variety of applications in addition to or in place of managing airdrop system 204. For example, wind information 306 may be used to manage trajectories of objects such as projectiles. These projectiles may be, for example, water dropped in firefighting missions or bullets used for military applications. In other illustrative examples, four-dimensional wind profiles 218 may be used to influence flight of aircraft such as aircraft carrying water for firefighting or aircraft carrying personnel for rescue missions.

In this manner, airdrop mission manager 216 may provide updated four-dimensional wind profiles 218 even as airdrop system 204 travels along path 212. This dynamic update of four-dimensional wind profiles 218 for airdrop system 204 after deployment of airdrop system 204 may allow airdrop system 204 to more accurately reach target location 208 in view of changes to wind 210 that may occur while airdrop system 204 travels along path 212.

Figure 4:
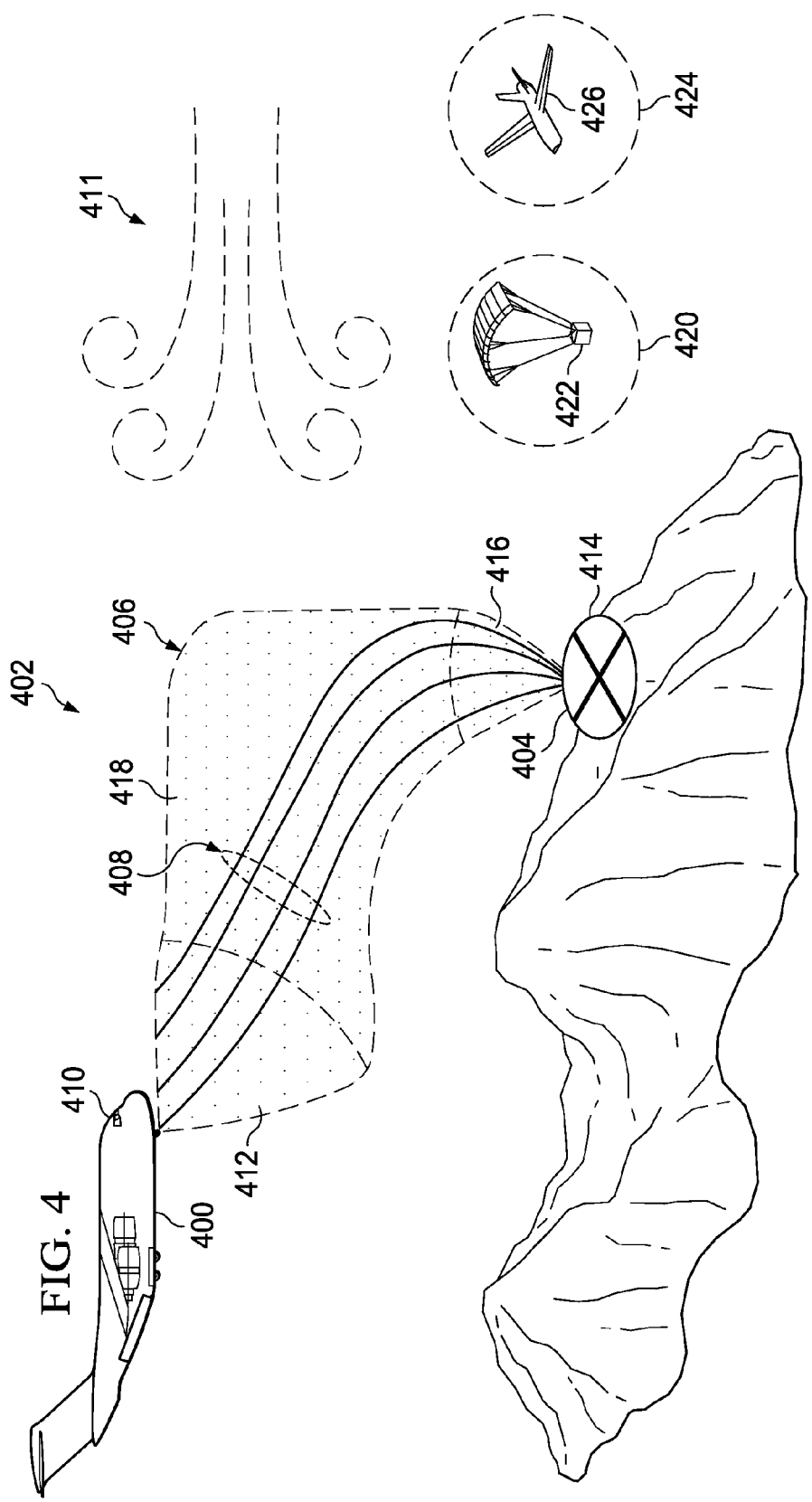
FIG. 4 is an illustration of measurements made in an airdrop environment in accordance with an illustrative embodiment.

Turning now to FIG. 4, an illustration of measurements made in an airdrop environment is depicted in accordance with an illustrative embodiment. In this depicted example, aircraft 400 in airdrop environment 402 has been instructed to deliver an airdrop system to target location 404.

As depicted, a four-dimensional wind profile for volume 406 is used to determine when to deploy an airdrop system to reach target location 404. Volume 406 includes potential paths 408 that the airdrop system may use to reach target location 404 from aircraft 400.

In this illustrative example, first sensor system 410 is associated with aircraft 400. First sensor system 410 measures wind 411 in first portion 412 of volume 406. This measurement in first portion 412 may form first wind information 308 in FIG. 3. Second sensor system 414 is associated with target location 404. Second sensor system 414 may be located at target location 404 or around target location 404. Second sensor system 414 measures wind 411 in second portion 416 of volume 406. This measurement in second portion 416 may form second wind information 310.

In this illustrative example, first wind information for measurements made of wind 411 in first portion 412 and second wind information for measurements made of wind 411 in second portion 416 of volume 406 may be used to identify wind information in third portion 418 of volume 406. Additionally, the first wind information and the second wind information may be used to generate a four-dimensional wind profile for first portion 412, second portion 416, and third portion 418.

As depicted, measurements of wind 411 may be made in other locations by additional platforms. For example, measurements of wind 411 in volume 420 may be made through a platform, such as airdrop system 422. Measurements of wind 411 also may be made in volume 424 using a platform such as unmanned aerial vehicle 426. These volumes are not volumes in which potential paths 408 are located. Instead, volume 420 and volume 424 are volumes in which measurements of wind 411 may be made to provide additional wind information. These measurements may be used in addition to the first wind information and the second wind information to identify wind information within third portion 418 of volume 406.

With the first wind information, the second wind information, and the additional wind information provided by other platforms for volume 406, other information about wind 411 may be predicted for different points in time for different locations within volume 406 to form a four-dimensional wind profile for volume 406. With this four-dimensional wind profile, a deployment location may be predicted to accurately deploy the next airdrop system from aircraft 400 to reach target location 404.

Figure 5:
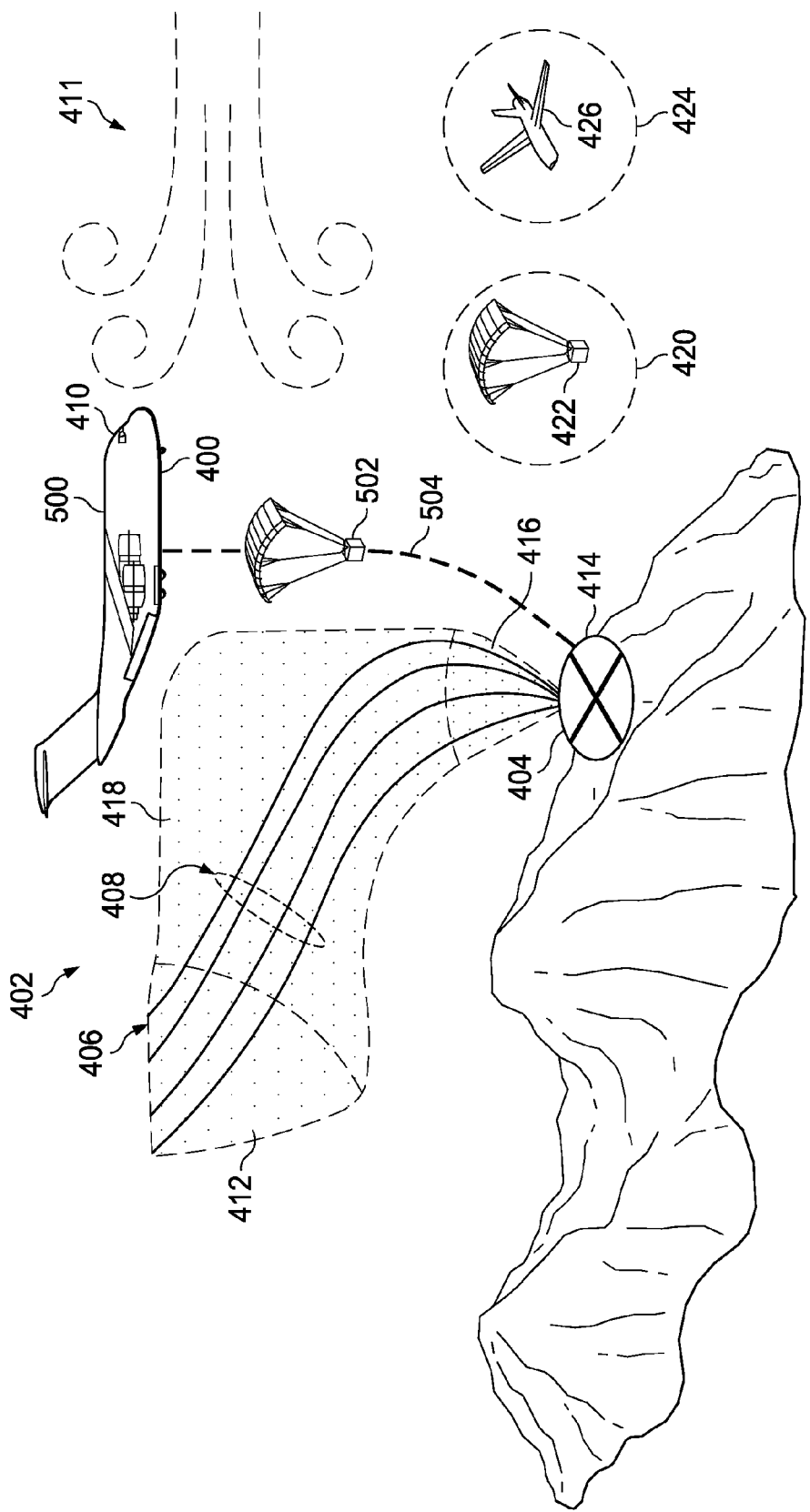
FIG. 5 is an illustration of an airdrop environment in which a four-dimensional wind profile is used to deliver an airdrop system to a target location in accordance with an illustrative embodiment.

Turning now to FIG. 5, an illustration of an airdrop environment in which a four-dimensional wind profile is used to deliver an airdrop system to a target location is depicted in accordance with an illustrative embodiment. A four-dimensional wind profile for wind 411 in volume 406 has been identified in airdrop environment 402. This four-dimensional wind profile is generated using four-dimensional wind profile generation system 220 in FIG. 2.

With this four-dimensional wind profile, airdrop mission manager 500 deploys airdrop system 502 from aircraft 400. Airdrop system 502 travels along path 504 to target location 404 in these illustrative examples.

As wind 411 changes as airdrop system 502 descends to target location 404, the four-dimensional wind profile may be updated. These updates to the four-dimensional wind profile may be used by an airdrop system 502 to control the descent airdrop system 502 along path 504. These updates may be two four-dimensional wind profiles 218, a number of instructions 222, or both the four-dimensional wind profiles 218 and the number of instructions 222 that are used by airdrop system 502 to control the descent of airdrop system 502 to target location 404 in these illustrative examples.

Figure 6:
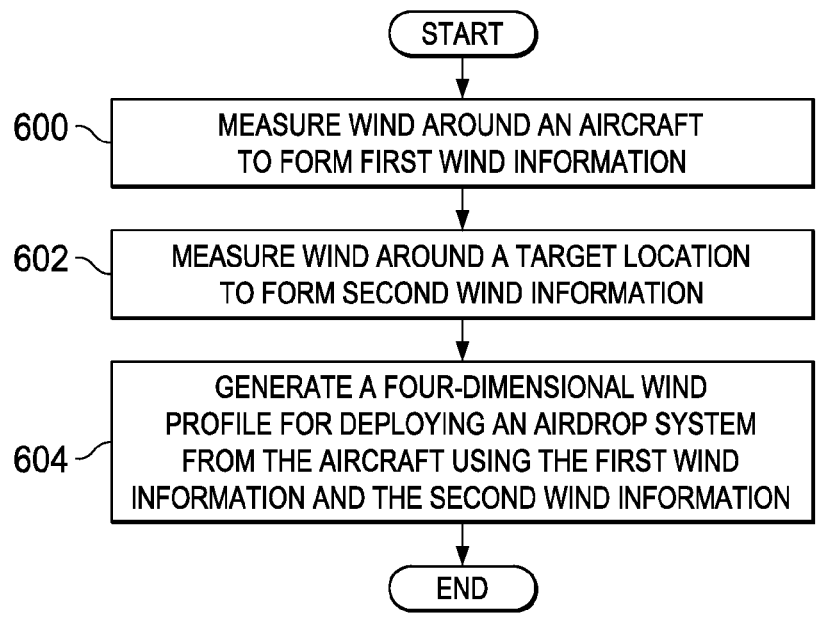
FIG. 6 is an illustration of a flowchart of a process for managing four-dimensional wind profiles in accordance with an illustrative embodiment.

Turning now to FIG. 6, an illustration of a flowchart of a process for managing four-dimensional wind profiles is depicted in accordance with an illustrative embodiment. The process illustrated in FIG. 6 may be implemented in airdrop environment 200 in FIG. 2. In particular, the process may be implemented using wind profile generator 300 in FIG. 3 for managing airdrop of airdrop system 204.

The process begins by measuring wind around an aircraft to form first wind information (operation 600). The process then measures wind around a target location to form second wind information (operation 602).

The process then generates a four-dimensional wind profile for deploying an airdrop system from the aircraft using the first wind information and the second wind information (operation 604) with the process terminating thereafter.

With the four-dimensional wind profile, an airdrop system may be deployed. In these illustrative examples, the four-dimensional wind profile may be used by an airdrop mission manager. This airdrop mission manager may be airdrop mission manager 216 located in aircraft 202. In other illustrative examples, this four-dimensional wind profile also may be used by an airdrop system, such as airdrop system 204. The four-dimensional wind profile may be used to manage the path of the airdrop system to the target location.

Figure 7:
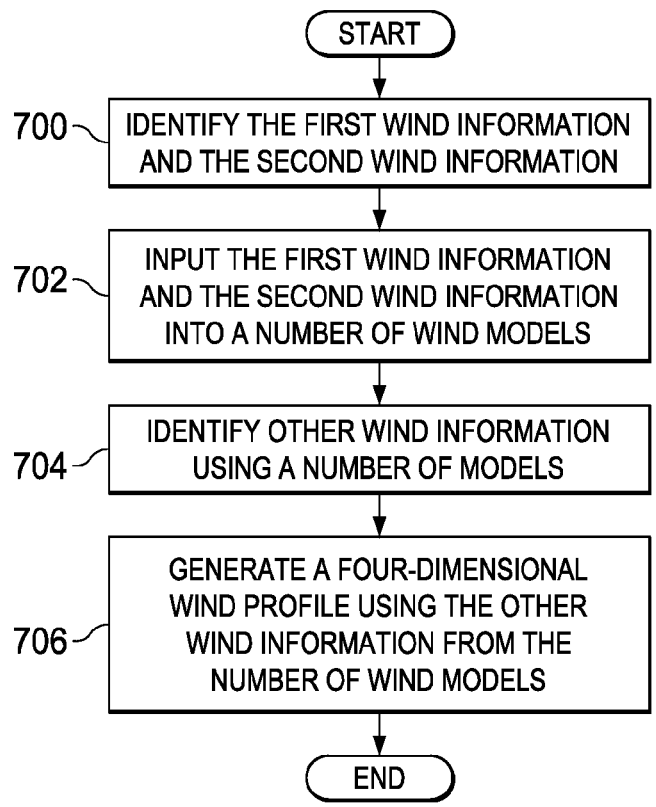
FIG. 7 is an illustration of a flowchart of a process for generating a four-dimensional wind profile for deploying an airdrop system from an aircraft in accordance with an illustrative embodiment.

Turning now to FIG. 7, an illustration of a flowchart of a process for generating a four-dimensional wind profile for deploying an airdrop system from an aircraft is depicted in accordance with an illustrative embodiment. This process is an example of one implementation for operation 604 in FIG. 6.

The process begins by identifying the first wind information and the second wind information (operation 700). The process then inputs the first wind information and the second wind information into a number of wind models (operation 702).

The process then identifies other wind information using the number of wind models (operation 704). The number of wind models in operation 704 may be models such as wind models 302 in FIG. 3. With the first wind information and the second wind information as inputs into the number of wind models, other wind information may be identified for generating a four-dimensional wind profile used to deploy an airdrop system. In these illustrative examples, the other wind information is information predicted about the wind for different points in time in different locations.

The process then generates a four-dimensional wind profile using the other wind information from the number of wind models (operation 706). The process terminates thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, an additional number of operations may be present in the flowchart in FIG. 7 to take into account additional wind information. This additional wind information may be received from measurements made in other locations such as already deployed airdrop systems in additional locations. This information may be used in addition to or in place of the first wind information and the second wind information to identify other wind information. Further, the process in FIG. 7 also may predict future wind information for locations 214 around aircraft 202 and target location 208.

Figure 8:
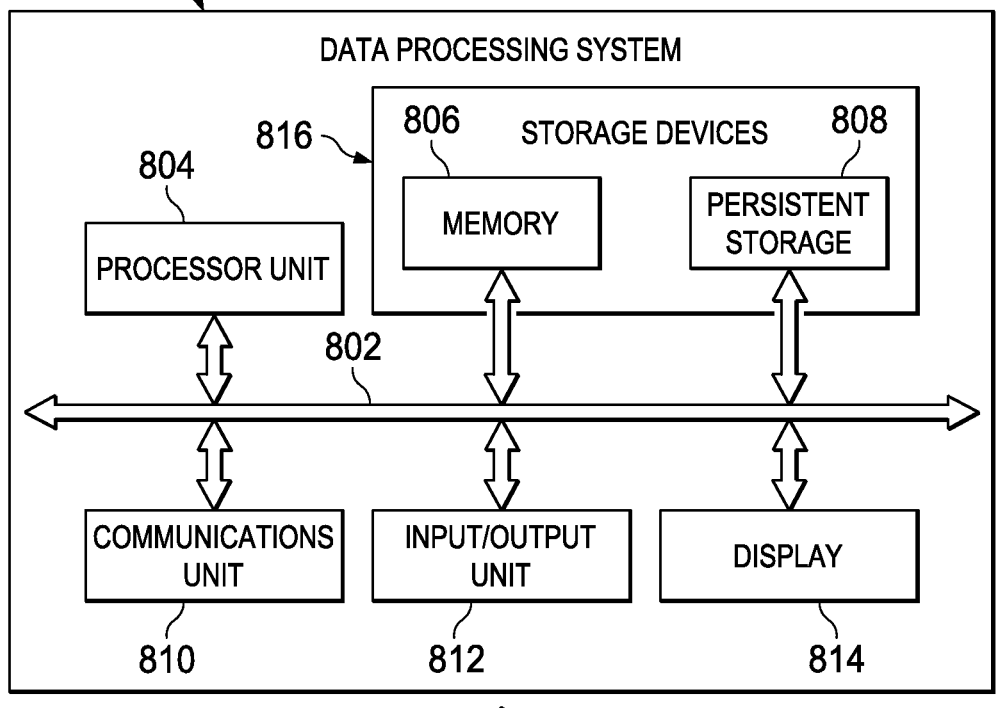
FIG. 8 is an illustration of a block diagram of a data processing system in accordance with an illustrative embodiment.
Figure 8:
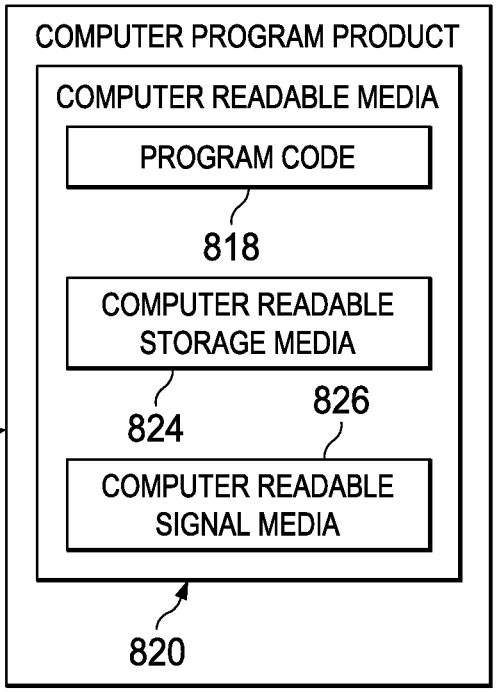

Turning now to FIG. 8, an illustration of a block diagram of a data processing system is depicted in accordance with an illustrative embodiment. Data processing system 800 may be used to implement one or more computers for four-dimensional wind profile generation system 220 in FIG. 2. In this illustrative example, data processing system 800 includes communications framework 802, which provides communications between processor unit 804, memory 806, persistent storage 808, communications unit 810, input/output (I/O) unit 812, and display 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a method and apparatus for managing airdrop systems. For example, the illustrative embodiments provide a method and apparatus for more accurately deploying airdrop systems to target locations. The illustrative embodiments take into account wind at different altitudes. In particular, the illustrative embodiments may take into account wind at different locations with respect to terrain or horizontal plane along the different altitudes. The illustrative embodiments may predict wind in locations that are not measured.

Through the use of models, the wind may be identified and used to generate four-dimensional wind profiles for deploying an airdrop system to reach a target location. With one or more illustrative embodiments, increased accuracy in managing airdrop systems may be accomplished through the use of models to predict information about the wind over different points in time for different locations.

In this manner, higher altitudes may be used to deliver cargo through airdrop systems with greater accuracy. With this ability to increase accuracy at higher altitudes, the risk of detection, exposure to gunfire, hazardous terrain, and other risks may be reduced or avoided.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a trajectory of an object to a target location, the method comprising:
    measuring wind around a platform to form a first wind information;
    predicting wind in a volume of air that includes potential paths from the object to the target location;
    measuring wind around the target location to form a second wind information; and
    generating a four-dimensional wind profile configured to assist managing the trajectory of the object using the first wind information, the second wind information, and at least one effect on a wind model.

2. The method of claim 1, wherein the four-dimensional wind profile includes wind information for a number of future points in time at a number of locations.

3. The method of claim 1, wherein generating the four-dimensional wind profile further comprises:
    identifying wind information for the wind from the platform to the target location using a number of wind models and the first wind information and the second wind information; and
    the at least one effect on the wind model being generated by at least one of: a river, a canyon, a building, a bridge, a dam, a monument, precipitation, cloud cover, solar radiation, volcanic activity, and gravity.

4. The method of claim 3, wherein identifying the wind information for the wind from the platform to the target location using the number of wind models and the first wind information and the second wind information comprises:

identifying the wind information for the wind from the platform to the target location using the number of wind models and the first wind information and the second wind information, wherein the number of wind models takes into account effects selected from at least one of weather effects and terrain effects.

5. The method of claim 1 further comprising:
selecting a deployment location to release the object from an aircraft using the four-dimensional wind profile such that only the object provides any data to the four dimensional wind profile based upon a target flyover.

6. The method of claim 1, further comprising:
measuring the wind at a number of other locations in addition to around the platform and around the target location to form additional wind information; and
generating the four-dimensional wind profile for use in deploying the object using the first wind information, the second wind information, and the additional wind information.

7. The method of claim 6, wherein measuring the wind at the number of other locations in addition to around the platform and around the target location to form the additional wind information comprises:
measuring the wind at the number of other locations in addition to around the platform and around the target location at a number of already deployed airdrop systems to form the additional wind information.

8. The method of claim 1, wherein measuring the wind around the platform comprises:
measuring the wind around the platform using a sensor system.

9. The method of claim 8, wherein measuring the wind around the platform using the sensor system comprises:
receiving the first wind information and the second wind information by a wind profile generator;
generating the four-dimensional wind profile using the first wind information and the second wind information; and
sending the four-dimensional wind profile to at least one of an airdrop mission manager and the object.

10. The method of claim 1,
wherein measuring wind in the volume of air that includes potential paths from the object to the target location comprises a measurement from a second platform located outside of the volume of air.

11. A method for managing a descent of an object, the method comprising:
receiving, in an airdrop mission manager, a target location;
identifying, using a profile generation system, a volume of air containing potential paths from the object to the target location;
identifying wind information in the volume of air, the wind information comprising at least one effect on a wind model; and
generating a four-dimensional wind profile configured to assist managing the descent of the object using the wind information and a number of wind models.

12. An apparatus comprising:
a wind profile generator configured to: receive a first wind information from a first measurement of wind around a platform, receive a second wind information from a second measurement of the wind around a target location, and generate a four-dimensional wind profile for use in deploying an object from the platform based upon the first wind information and the second wind information, and at least one effect on a wind model.

13. The apparatus of claim 12, wherein the wind profile generator is configured to generate the four-dimensional wind profile for use in deploying the object from the platform using the first wind information, the second wind information, and a number of wind models, and the at least one effect on the wind model being generated by at least one of: a river, a canyon, a building, a bridge, a dam, a monument, precipitation, cloud cover, solar radiation, volcanic activity, and gravity.

14. The apparatus of claim 12, wherein the four-dimensional wind profile includes wind information for a number of future points in time at a number of locations.

15. The apparatus of claim 14, wherein the number of locations is in a volume encompassing potential paths from the platform to the target location for the object.

16. The apparatus of claim 12, wherein the wind profile generator is configured to receive additional wind information from measuring the wind at a number of additional locations in addition to around the platform and around the target location and wherein the wind profile generator is configured to generate the four-dimensional wind profile for use in deploying the object from the platform using the first wind information, the second wind information, and the additional wind information; and
further comprising a mission manager configured to generate instructions based upon an update from the wind profile generator such that the object may change a path to the target location.

17. The apparatus of claim 12, wherein the wind profile generator is located on at least one of a mobile platform, a stationary platform, a land-based structure, an aquatic-based structure, an already deployed airdrop system, an aircraft, a surface ship, a tank, a personnel carrier, a train, a satellite, and a submarine.

18. The method of claim 11, further comprising:
receiving, in a wind profile generation system, validation data for the four-dimensional wind profile;
characterizing, using the wind profile generation system, a wind variability based upon the validation data;
characterizing a predicted error of managing the descent of the object based upon the wind variability and statistical variations of the wind near a platform deploying the object; and
the at least one effect on the wind model being generated by at least one of: a river, a canyon, a building, a bridge, a dam, a monument, precipitation, cloud cover, solar radiation, volcanic activity, and gravity.

19. The method of claim 11, further comprising the wind information being based on measurements by a platform that is not within the volume of air containing potential paths from the object to the target location.

20. The apparatus of claim 12, further comprising a wind profile generation system configured to receive validation data for the four-dimensional wind profile and characterize a wind variability based upon the validation data, such that a predicted error may be characterized.

* * * * *